United States Patent [19]

Niizawa

[11] Patent Number: 5,160,950
[45] Date of Patent: Nov. 3, 1992

[54] IMAGE PROJECTING APPARATUS FURNISHED WITH IMAGE ROTATING MECHANISM

[75] Inventor: Koji Niizawa, Odawara, Japan

[73] Assignee: Minolta Camera Kabushiki Kaisha, Osaka, Japan

[21] Appl. No.: 713,680

[22] Filed: Jun. 11, 1991

[30] Foreign Application Priority Data

Jun. 13, 1990 [JP] Japan ............... 2-154656
May 13, 1991 [JP] Japan ............... 3-107413

[51] Int. Cl.⁵ .................................... G03B 23/08
[52] U.S. Cl. .................................... 353/26 A; 353/25; 353/81; 353/27 A
[58] Field of Search ............ 353/81, 27 A, 27 R, 353/26 A, 26 R, 25, 98, 77

[56] References Cited

U.S. PATENT DOCUMENTS

| | | | |
|---|---|---|---|
| 2,966,096 | 12/1960 | D'Incerti et al. | 353/81 |
| 3,871,759 | 3/1975 | Crew | 353/27 R |
| 3,981,574 | 9/1976 | Jesensky et al. | 353/81 |
| 4,080,056 | 3/1978 | Jesensky et al. | 353/81 |
| 4,215,915 | 8/1980 | Freiberg | 353/81 |
| 4,436,391 | 3/1984 | Kashiwagi | 353/81 |
| 4,710,004 | 12/1987 | Verhaagen | 353/81 |
| 4,825,243 | 4/1989 | Ito et al. | 353/26 A |
| 4,875,768 | 10/1989 | Hirasawa et al. | 353/27 A |
| 4,952,052 | 8/1990 | Ueda et al. | 353/27 R |
| 5,023,657 | 6/1991 | Kuriyama | 353/26 A |

FOREIGN PATENT DOCUMENTS

0135819 6/1987 Japan ............... 353/81
63-235922 9/1988 Japan .

Primary Examiner—William A. Cuchlinski, Jr.
Assistant Examiner—William C. Dowling
Attorney, Agent, or Firm—Willian Brinks Olds Hofer Gilson & Lione

[57] ABSTRACT

An image projecting apparatus is disclosed which is provided with a film carrier part for retaining a microfilm, a screen for allowing an image recorded on the film to be projected thereon, and an optical image rotating mechanism disposed in a projected light path extending from a light source to the screen and adapted to rotate the image recorded on the film and consequently allow the image to be projected in a desired posture on the screen. The operator, even when the image on the film is projected in a rotated state, is enabled to move the film in a prescribed direction in accordance with the angle of the rotation of the image produced by the optical image rotating mechanism by keeping an eye on the image projected on the screen and, at the same time, manipulating a key corresponding to the direction in which the image is desired to be observed or to the direction identical to the direction in which the image is desired to be moved.

17 Claims, 13 Drawing Sheets

| ROTATION AMOUNT OF PRISM \ ARROW KEYS | ⇧ (50a) | ⇨ (50b) | ⇩ (50c) | ⇦ (50d) |
|---|---|---|---|---|
| 0°, 180° | ↓ | ← | ↑ | → |
| 45°, 225° | → | ↓ | ← | ↑ |
| 90°, 270° | ↑ | → | ↓ | ← |
| 135°, 315° | ← | ↑ | → | ↓ |

FIG.9

| ROTATION AMOUNT OF PRISM \ ARROW KEYS | ⇧ (50a) | ⇨ (50b) | ⇩ (50c) | ⇦ (50d) |
|---|---|---|---|---|
| 0°, 180° | ↑ | ← | ↓ | → |
| 45°, 225° | → | ↑ | ← | ↓ |
| 90°, 270° | ↓ | → | ↑ | ← |
| 135°, 315° | ← | ↓ | → | ↑ |

| CONTACTS OF SWITCH 59 / ROTATION AMOUNT OF PRISM | A | B | C | D |
|---|---|---|---|---|
| 0°, 180° | ↓ | ← | ↑ | → |
| 45°, 225° | → | ↓ | ← | ↑ |
| 90°, 270° | ↑ | → | ↓ | ← |
| 135°, 315° | ← | ↑ | → | ↓ |

| | MICROFICHE | | | | | | | | | | | | | |
|---|---|---|---|---|---|---|---|---|---|---|---|---|---|---|
| A1 | A2 | A3 | A4 | A5 | A6 | A7 | A8 | A9 | A10 | A11 | A12 | A13 | A14 |
| B1 | B2 | B3 | B4 | B5 | B6 | B7 | B8 | B9 | B10 | B11 | B12 | B13 | B14 |
| C1 | C2 | C3 | C4 | C5 | C6 | C7 | C8 | C9 | C10 | C11 | C12 | C13 | C14 |
| D1 | D2 | D3 | D4 | D5 | D6 | D7 | D8 | D9 | D10 | D11 | D12 | D13 | D14 |
| E1 | E2 | E3 | E4 | E5 | E6 | E7 | E8 | E9 | E10 | E11 | E12 | E13 | E14 |
| F1 | F2 | F3 | F4 | F5 | F6 | F7 | F8 | F9 | F10 | F11 | F12 | F13 | F14 |
| G1 | G2 | G3 | G4 | G5 | G6 | G7 | G8 | G9 | G10 | G11 | G12 | G13 | G14 |

| A1 | A2 | A3 | A4 | A5 | A6 | A7 | A8 | A9 | A10 | A11 | A12 |
|---|---|---|---|---|---|---|---|---|---|---|---|
| | | | | | | | | | | | B12 |
| | | | | | | | | | | | C12 |
| | | | | | | | | | | | D12 |
| | | | | | | | | | | | E12 |

IMAGE PROJECTING APPARATUS FURNISHED WITH IMAGE ROTATING MECHANISM

BACKGROUND OF THE INVENTION

1. Field of the Invention

This invention relates to an image projecting apparatus for enabling an image recorded on a microfilm to be projected on a magnified scale on a screen and more particularly to an image projecting apparatus furnished with an image rotating mechanism for enabling the image in process of projection onto the screen to be rotated to a desired posture.

2. Description of the Related Art

In the operation of an image projecting apparatus such as a reader for enabling an image recorded on a microfilm to be projected on a magnified scale on a screen or a reader printer for copying a projected image, there are times when the image on the microfilm needs to be projected on the screen with the posture thereof suitably rotated instead of being projected directly in its original posture on the screen. The reason for this necessary change of posture is that all the images are not photographed in a prescribed posture in a microfilm; some of the images are photographed as slightly tilted or, in the case of a microfiche having a multiplicity of image frames recorded thereon after the fashion of a matrix, some image frames are recorded as arranged longitudinally and others as arranged laterally, so that the posture of image frames varies depending on the kind of film.

The image projecting apparatus, therefore, is designed to be provided in a projected light path with an optical image rotating mechanism formed of a Dove prism, so that no matter what posture an image frame may assume on a film, the image projected from this frame will be projected in a desired posture on the screen. An operator of the image projecting apparatus which is furnished in the projected light path with the image rotating mechanism as described above moves the image frames on the film sequentially past the projector orifice or makes fine adjustment of their positions relative to the projector orifice while keeping an eye on the images projected on the screen for the purpose of retrieving a desired image frame from among the multiplicity of image frames recorded as arrayed after the fashion of a matrix on a microfiche, for example. At times, the direction in which the film is actually moved fails to conform with the direction in which the series of image frames is moved past the screen. When the operator, in an effort to take a look at the left side of the image currently projected on the screen, moves the film unwittingly to the right by manipulating a key bearing a leftward arrow mark on the control board, the image may possibly be moved in completely the opposite direction, depending on the angle of rotation of the prism used in the microfiche. If this apparatus allows of an accident of this nature, it is deficient in operational efficiency. The operating panel or the control board is provided with keys bearing arrow marks indicating the four directions, i.e. the upper, lower, left, and right directions. In the conventional apparatus, these arrow-marked keys correspond only to the directions of movement of the film. Since the directions of movement of the image on the screen do not agree with the directions of the arrow marks indicated on the keys, the operator is at a loss for selection of a right key on a given occasion.

Japanese Patent Application Laid-Open 63-235,922 discloses an image projecting apparatus adapted so that the direction in which the film should be actually moved correctly is displayed on a display part, depending on the condition of rotation of an image rotating mechanism. In the case of this apparatus, the operator is required to manipulate the movement of the film while comparing the direction in which the image is desired to be moved on the screen with the direction in which the film is to be actually moved.

SUMMARY OF THE INVENTION

An object of this invention is to provide an image projecting apparatus furnished with a screen on which an image recorded on a microfilm is projected on a magnified scale and an optical image rotating mechanism which enables the image on the microfilm to be projected on the screen with the posture thereof changed as desired without reference to the direction in which the microfilm containing the image is placed in the projector unit of the apparatus.

Another object of this invention is to provide an image projecting apparatus of excellent operational efficiency furnished with an operating board having disposed thereon four input keys bearing arrow marks corresponding to the upper, lower, left, and right directions relative to the screen and adapted so that either of the images adjoining the image currently projected on the screen will be moved to the center of the screen by the operation of the input key corresponding to the direction in which the image in question falls relative to the image on the screen.

Still another object of this invention is to provide an image projecting apparatus of excellent operational efficiency so adapted that either of the images adjoining the image currently projected on the screen will be moved to the center of the screen by the operation of the input key bearing the arrow mark indicating the direction corresponding to the direction in which the selected image is desired to be moved on the screen.

A further object of this invention is to provide an image projecting apparatus furnished with a film retaining part for retaining a microfilm rotatably in a plane perpendicular to the path of a projected light and adapted so that when the film retaining part moves the microfilm, the microfilm will be moved in the stated direction proportionately to the amount of rotation of the image produced by an optical image rotating mechanism.

In accordance with the present invention, there is provided with an image projecting apparatus for causing an image recorded on a microfilm to be magnified with a lens and projected on a screen, comprising film retaining means for retaining said microfilm, image rotating means for rotating a projected image, detecting means for detecting the amount of rotation of said image rotating means, indicating means for indicating the direction of movement of said image projected on said screen, driving means for moving said retaining means in the direction of movement indicated by said indicating means, and control means for controlling the direction indicated by said indicating means and the direction of movement of said retaining means driven by said driving means in accordance with the amount of rotation detected by said detecting means.

By causing an image on a microfilm to be rotated with an optical image rotating mechanism, the image on the microfilm can be projected in a desired posture on a screen without reference to the posture which the film on the microfilm assumes relative to the film retaining part after the microfilm has been set in place. When the microfilm is to be moved for the purpose of causing the image projected on the screen to be moved on the screen, the direction of this movement of the microfilm is decided based on the amount of rotation of the image produced by the optical image rotating mechanism. The operator, therefore, is enabled to move easily the image projected on the screen correctly in a desired direction by selecting from the plurality of keys installed on the operating board the key bearing the arrow mark indicating the direction which corresponds to the direction in which the projected image on the screen is desired to be moved and operating this particular key.

BRIEF DESCRIPTION OF THE DRAWINGS

FIG. 7 (a) to FIG. 7 (d) are plan views illustrating part of a microfilm set in place in a carrier part, with images held in severally different postures;

FIG. 10 (a) to FIG. 10 (d) are schematic diagrams illustrating a switch rotated as synchronized with the rotation of the prism and used in an image projecting apparatus as another embodiment of the invention;

FIG. 12 (a) to FIG. 12 (d) are schematic diagrams illustrating a switch of another type rotated as synchronized with the rotation of the prism;

FIG. 13 (a) and FIG. 13 (b) are front views each illustrating an example of microfiche;

DESCRIPTION OF THE PREFERRED EMBODIMENTS

Figure 1:
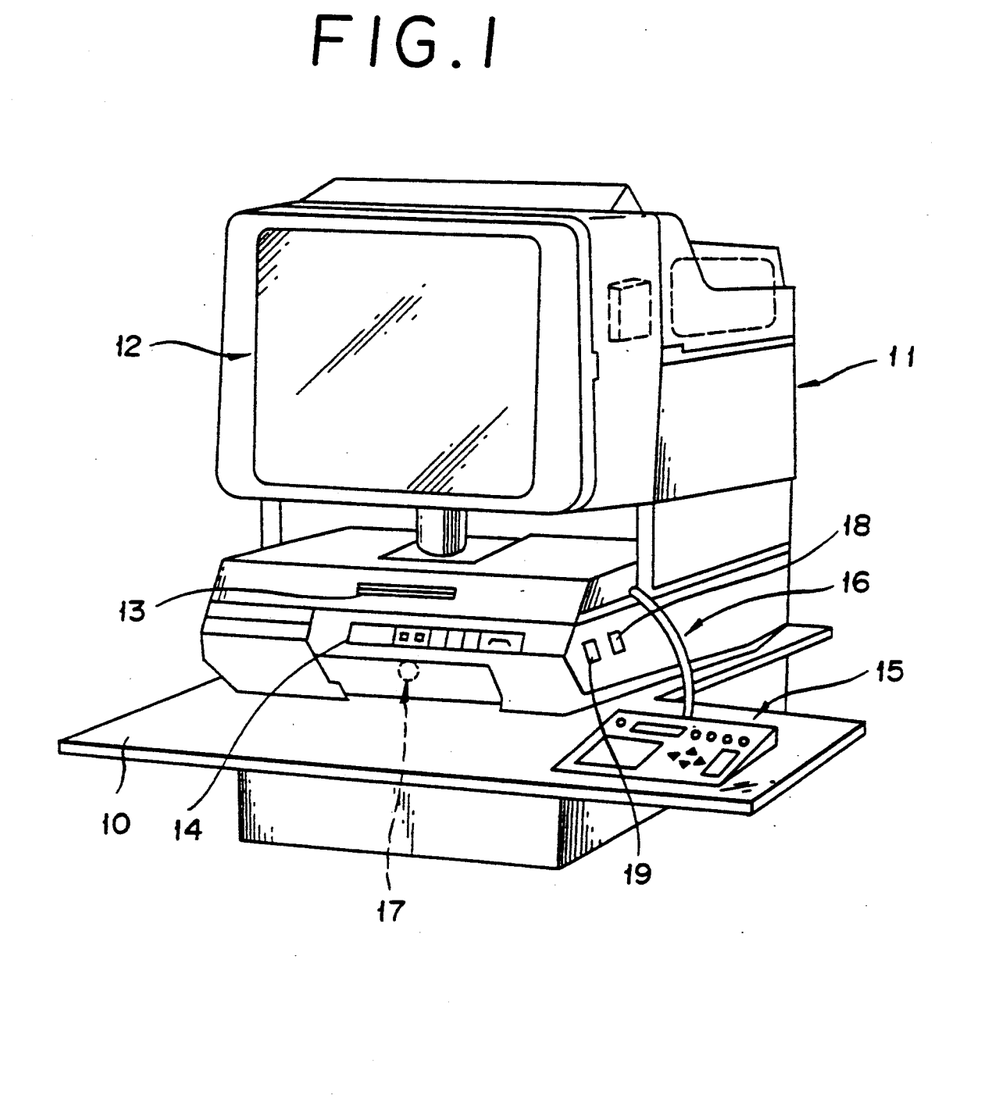
FIG. 1 is a perspective view illustrating the appearance of an image projecting apparatus.

As illustrated in FIG. 1, a reader printer which is one form of image projecting apparatus is provided with a main body 11 of apparatus seated on an operating table 10 and the main body 11 is provided on the upper front surface thereof with a screen 12 on which an image is projected. Below the screen 12 are disposed a film insertion inlet 13 and an operating panel 14 for delivery of inputs as to the selection of the format of film and the selection between the positive and negative types of film. A control board 15 seated on the operating table 10 is connected through the medium of a cable 16 to the control part of the main body 11 of apparatus. Inside the main body 11 of apparatus is formed a projected light path (not shown) extending from a light source 17 for projecting a light to the screen 12. Reference numeral 18 denotes a power source switch and reference numeral 19 an image rotating switch for suitably rotating an image projected on the screen 12.

Figure 13A:
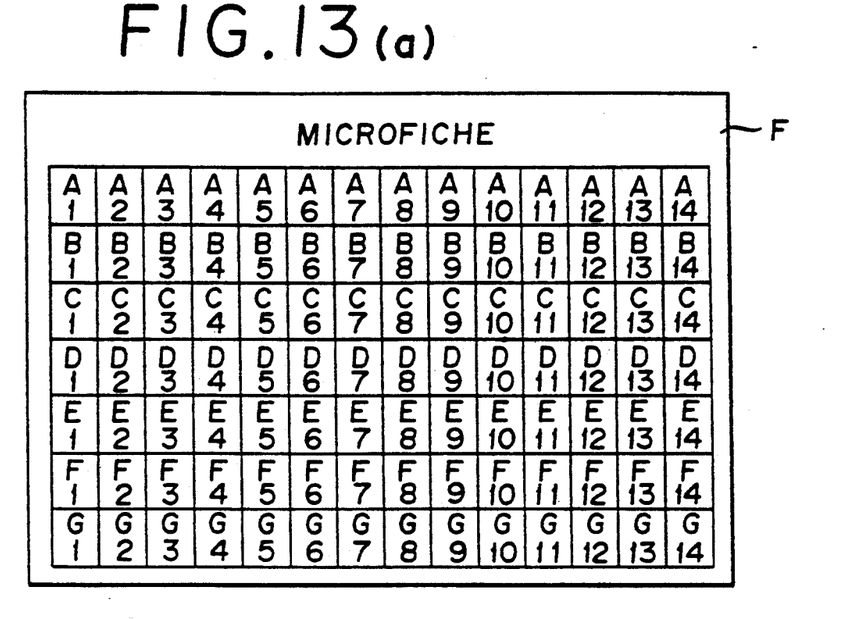
Figure 13B:
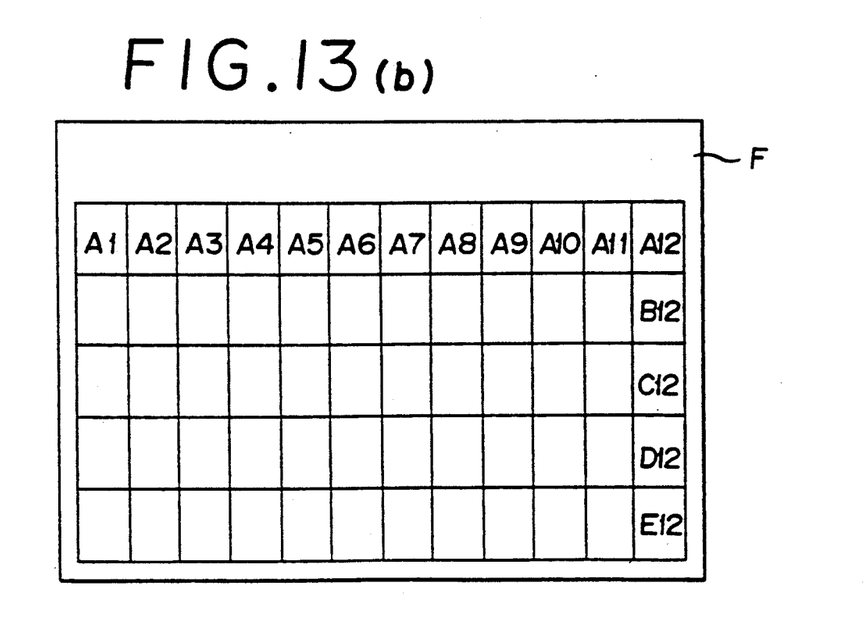

Concrete examples of the microfilm F to be loaded in the reader printer described above are illustrated in FIGS. 13 (a) and (b). These are invariably microfiches, on which images are recorded as arrayed after the fashion of a matrix. The microfiches come in various forms other than those illustrated herein.

Figure 2:
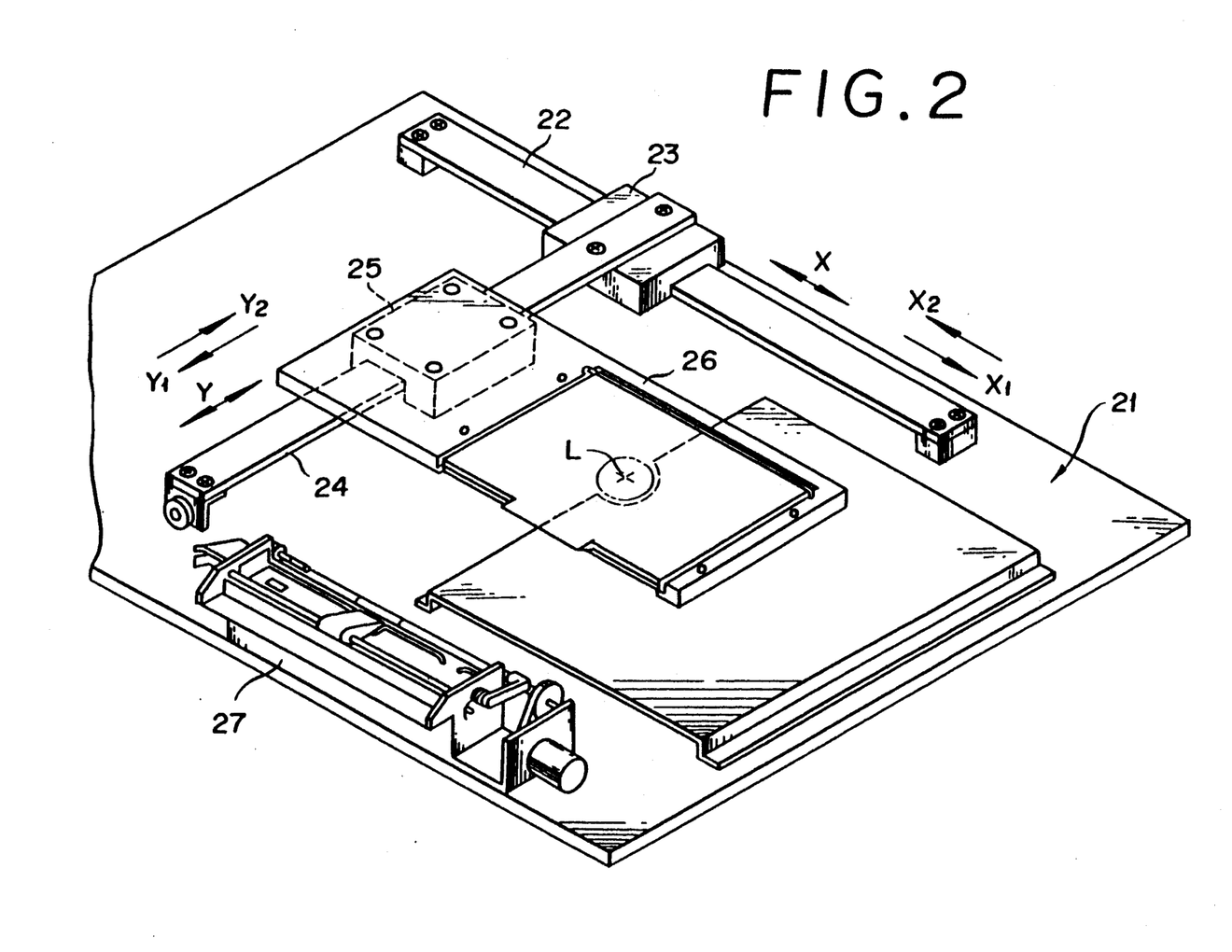
FIG. 2 is a perspective view illustrating a film retaining part in the image projecting apparatus shown in FIG. 1.

FIG. 2 is a diagram illustrating the construction of a film retaining part for retaining the microfiche F inserted through the film insertion inlet 13. On a base 21 incorporated in the main body 11 of apparatus, an X-direction guide rail 22 is fixed as extended in the direction of width of the main body 11 of apparatus. To a first linear pulse motor 23 which moves along the guide rail 22, a Y-direction guide rail 24 extended in a direction perpendicular to the X-direction guide rail 22 is attached. To a second linear pulse motor 25 which moves along the Y-direction guide rail 24, a carrier part 26 to be loaded with the microfiche F is attached. The base 21 is provided with an automatic loading conveyor part 27 for the purpose of transferring the microfiche F inserted through the film insertion inlet 13 to the carrier part 26. The microfiche F set in place in the carrier part 26, therefore, is allowed to be moved selectively in the direction of X axis and the direction of Y axis on the carrier part 26. Thus, any desired one of the multiplicity of image frames recorded on the microfiche F can be moved to and located at the position of the center L of the projected light path.

Figure 3:
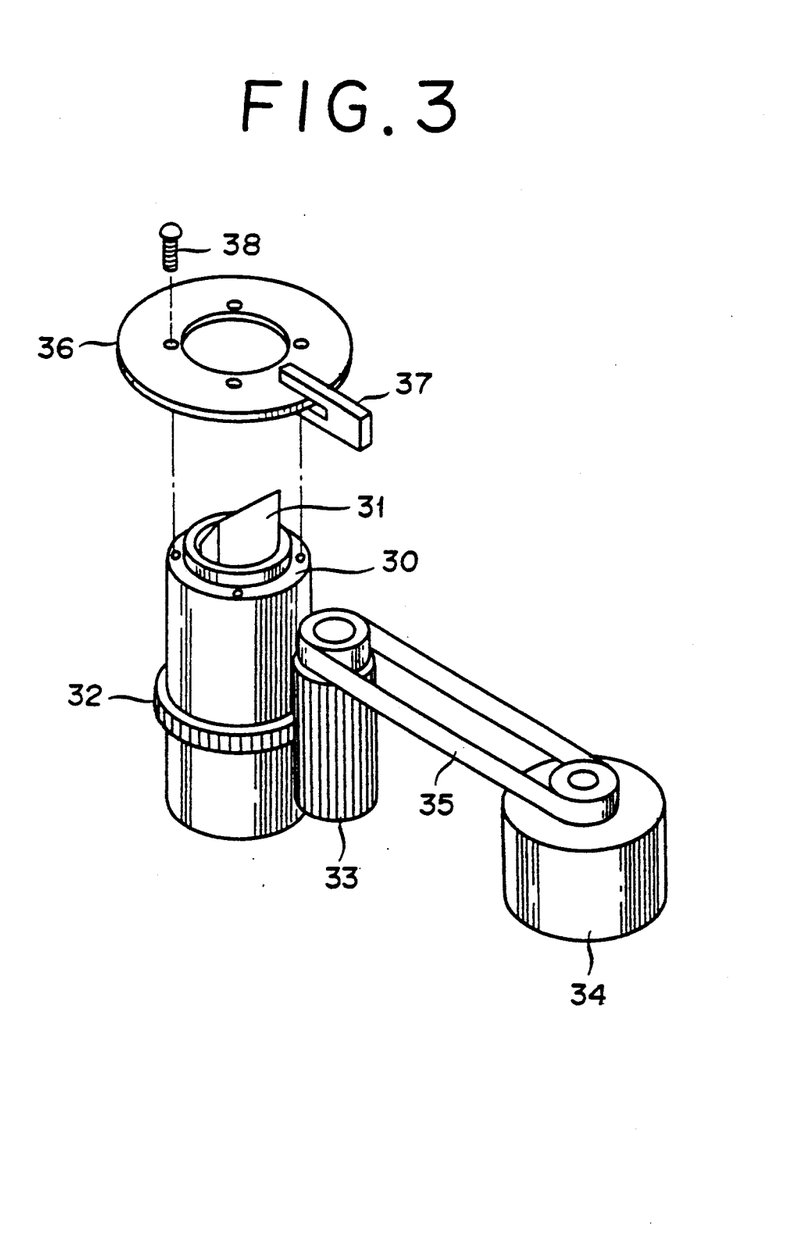
FIG. 3 is a perspective view illustrating an optical image rotating part.

FIG. 3 is a diagram illustrating an optical image rotating mechanism. A prism 31 is incorporated through the medium of a projecting lens in a lens barrel 30 which is disposed above the film retaining part shown in FIG. 2 and attached rotatably inside the main body 11 of apparatus. For enabling the posture of an image projected on the screen 12 to be changed by the rotation of the lens barrel 30, a drive gear 33 is meshed with an annular gear 32 which is disposed on the periphery of the lens barrel 30 so that the rotation of the main shaft of a motor 34 may be transmitted to the drive gear 33 through the medium of a timing pulley 35.

To the end surface of the lens barrel 30, a disc 36 adapted to function as a photointerrupter is attached with screws 38. A sensor unit 37 adapted to detect the angle of rotation of this disc 36 is disposed inside the main body 11 of apparatus. The purpose of this detection of the angle of rotation of the disc 36 consists in determining the amount of rotation of the projected image produced by the optical image rotating mechanism on the basis of the outcome of the detection. This disc 36 is illustrated on a magnified scale in FIG. 4.

Figure 4:
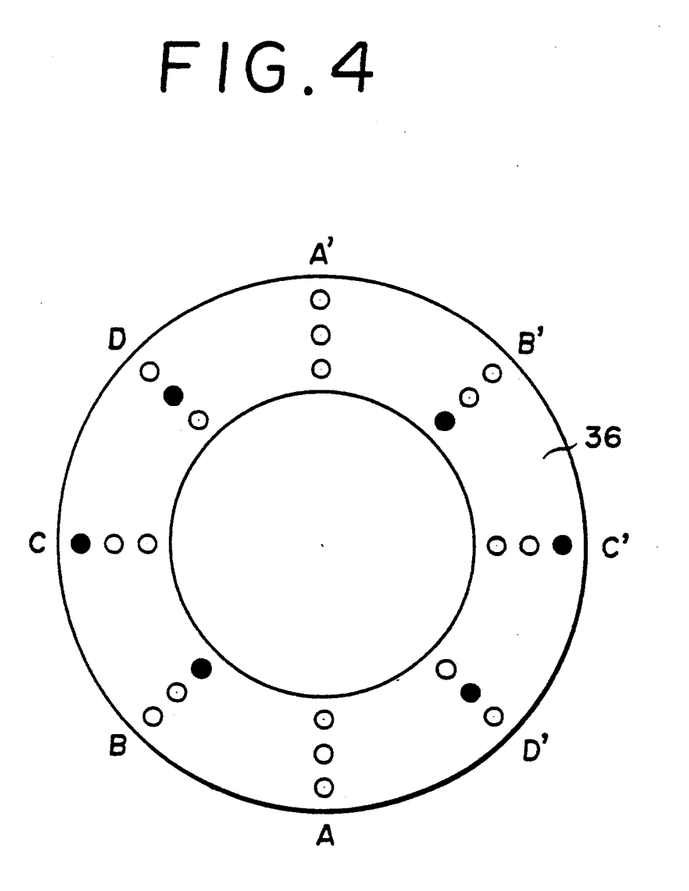
FIG. 4 is a magnified perspective view illustrating a disc shown in FIG. 3.

Through lack of due attention on the part of the operator, the microfiche F may be possibly set on the carrier part 26 in the state rotated by 90 degrees clockwise or counterclockwise or in the state rotated by 180 degrees, namely turned completely upside down, from the proper posture thereof. When the microfiche F is set in its proper posture and yet the image frames are recorded as directed laterally, the direction in which images are projected on the screen is rotated by 90 degrees clockwise or counterclockwise from the direction in which images from longitudinally recorded image frames are projected on the screen. When the prism 31 is rotated by 45 degrees, for example, around the central axis of rotation of the lens barrel 30 in this case, the image projected on the screen 12 is rotated by 90 degrees on the screen 12. To permit detection of the angle of rotation of the disc 36 at angular intervals of 45 degrees, position determining parts each formed of a group of three sensor on-off parts arranged in the radial direction of the disc 36 are formed in the disc 36 at angular intervals of 45 degrees. The corresponding sensor on-off parts in two groups adjoining each other in the circumferential direction assume identical radial positions. The sensor unit 37 is provided with three pairs of sensors (not shown) consisting of a light-receiving element and a light-emitting element and adapted to confront the individual sensor on-off parts. As illustrated in FIG. 4, a total of 24 sensor on-off parts are formed in the disc 36. In the diagram, holes are actually bored on each in the white circular parts enclosed with a solid line and no hole is bored in the black circular parts. A given angle of rotation of the lens barrel 30 is discriminated by the fact that a corresponding one of the three pairs of sensors is turned on or off. On the assumption that the position determining parts disposed at the standard position or home position of the lens barrel 30 are those indicated by the symbol A in the diagram, the other position determining parts are formed as indicated by the symbols B, C, and D. When the lens barrel 30 is rotated by 180 degrees, the image projected on the screen 12 is rotated by 360 degrees and consequently returned to the original posture and, as a result, the position determining parts A' disposed at the position rotated by 180 degrees from the standard position have sensor on-off parts arranged in the same pattern as those of the position determining parts A. Similarly, the position determining parts B and B', C and C', and D and D' have their holes bored severally at identical radial positions.

Figure 5:
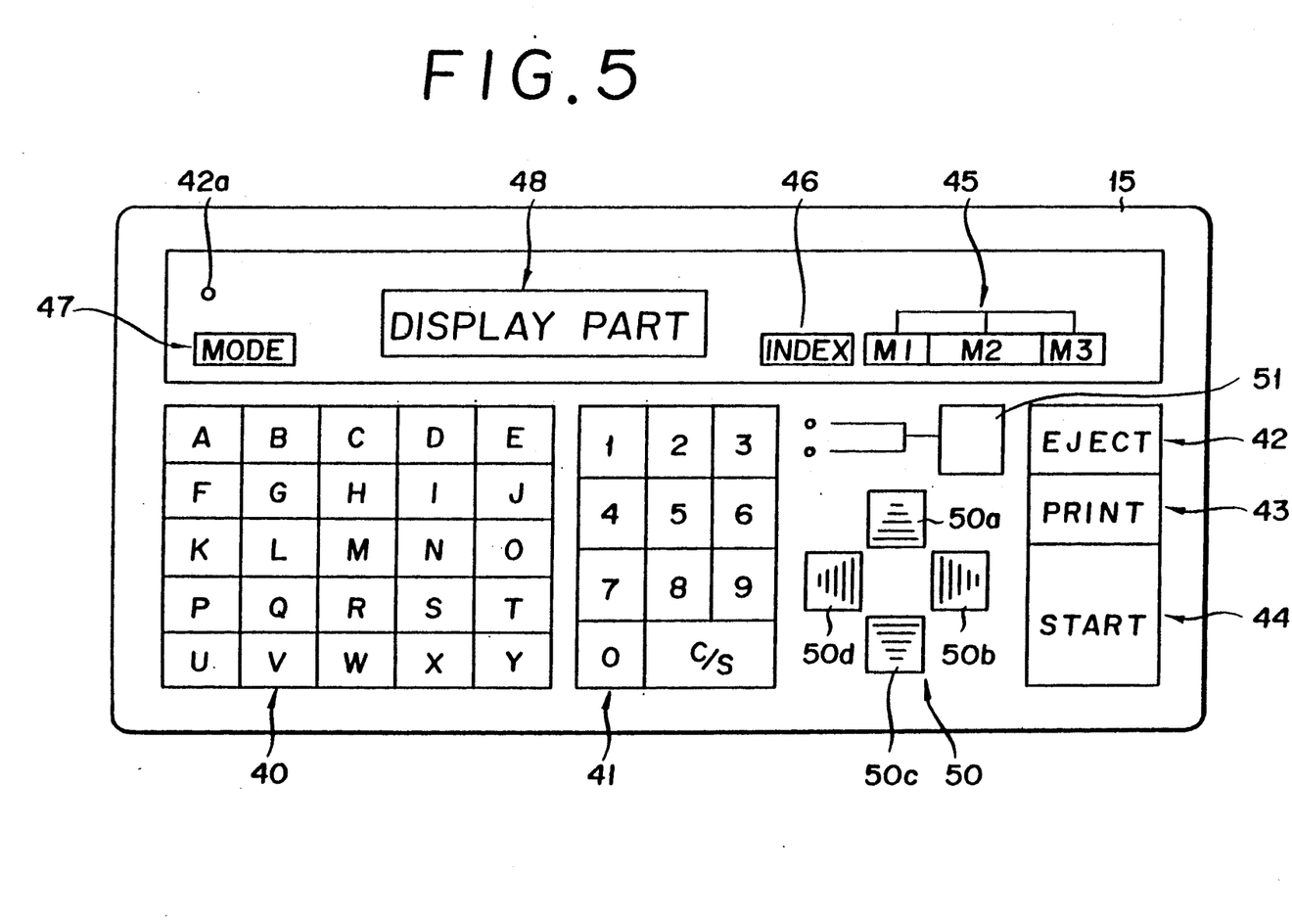
FIG. 5 is a magnified plan view illustrating a control board shown in FIG. 1.

FIG. 5 is a diagram illustrating in detail the control board 15 shown in FIG. 1. Reference numerals 40 and 41 denote address keys for the microfiche F and reference numeral 42 denotes an eject key. When this eject key 42 is depressed, the motors 23, 25 are set into motion, the carrier part 26 is moved to the ejecting position, and the microfiche F is taken out of the insertion inlet 13. While the carrier part 26 remains at the ejecting position, a display light formed such as of a light-emitting diode stays aglow to indicate that the apparatus allows insertion of the microfiche F. Denoted by reference numeral 43 is a print key which is used in causing an image projected on the screen 12 to be printed on a copying paper, reference numeral 44 a start key for designating start of retrieval, reference numeral 45 a memory key for memorizing an input address and performing various actions of memory, reference numeral 46 an index key for selecting and indicating an index recorded on the microfiche F, and reference numeral 47 a mode selection key for selecting and indicating a mode registered on a varying format of the microfiche F. Reference numeral 48 denotes a display part for displaying the information introduced via the address keys 40, 41, the index key 46, the mode selection key 47, etc.

Further, the control board 15 mentioned above is provided, as illustrated in FIG. 5, with a film moving key or fine adjustment/frame feeding key 50. For allowing the fine adjustment/frame feeding key 50 to effect selection between inching the film F and moving it one frame at a stroke by means of the carrier part 26, there is provided a selection key 51. This fine adjustment/frame feeding key 50, as illustrated in FIG. 5, comprises an arrow mark key 50a to be operated for a downward movement of the projected image on the screen 12 for the purpose of showing the upper side of the image projected on the screen 12, an arrow mark key 50b to be operated for a leftward movement, an arrow mark key 50c to be operated for an upward movement, and an arrow mark key 50d to be operated for a rightward movement respectively of the projected image on the screen 12.

Figure 6:
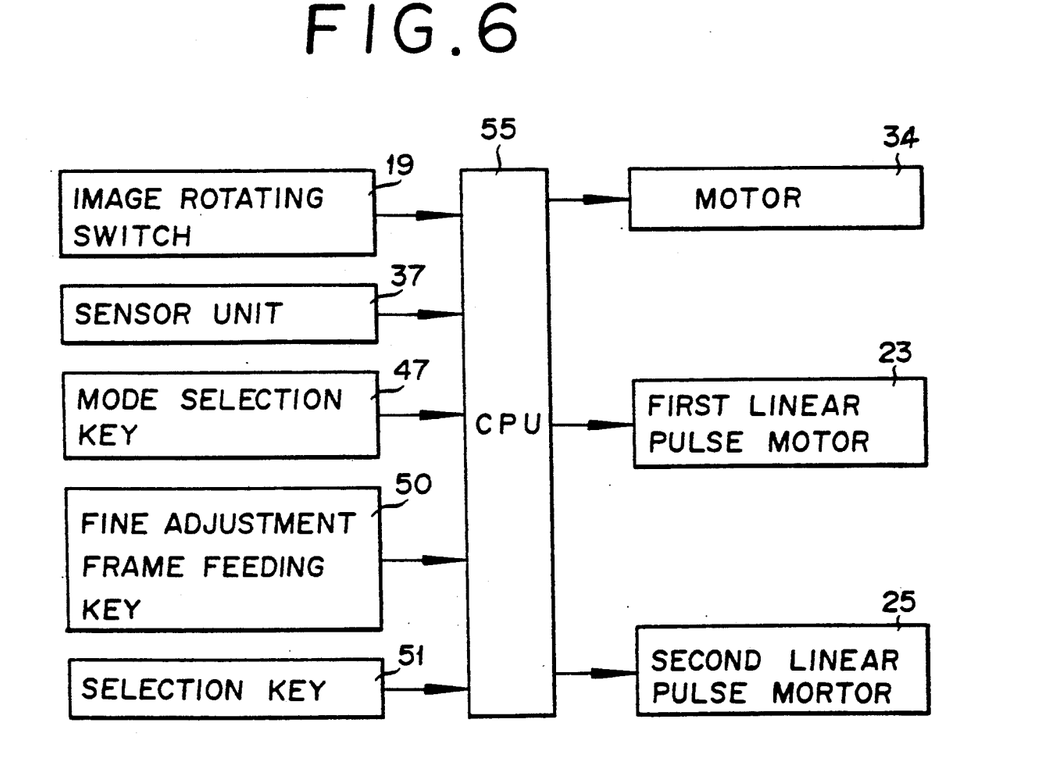
FIG. 6 is a block diagram illustrating a control circuit for the image projecting apparatus.
Figure 7A:
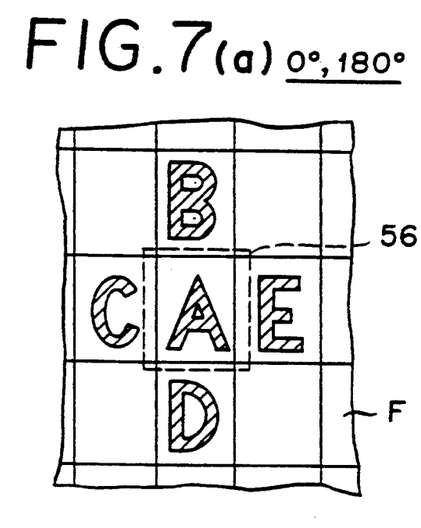
Figure 7B:
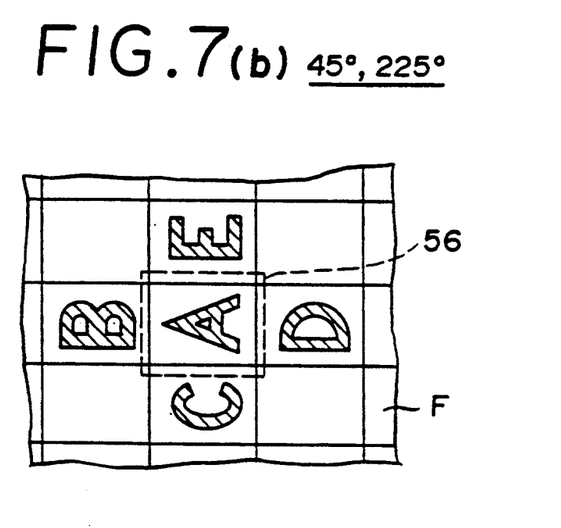
Figure 7C:
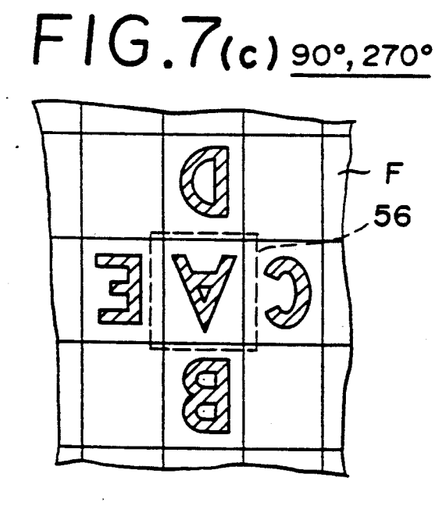
Figure 7D:
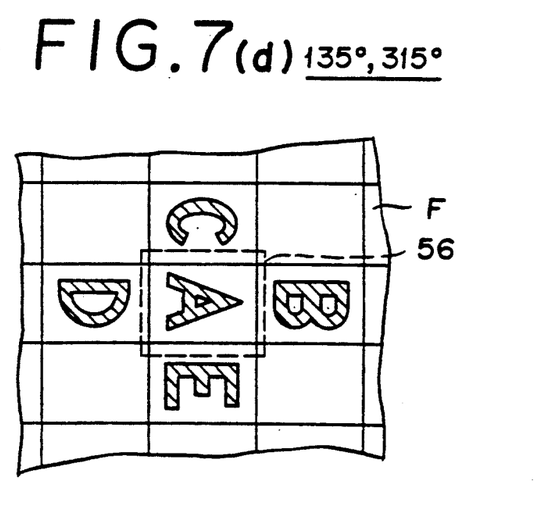

A control circuit for computing the direction in which the microfiche F, namely the carrier part 26, is to be actually moved by the operation of the fine adjustment/frame feeding key 50 is illustrated in FIG. 6.

First, when the image projected on the screen 12 is not in its prescribed posture, the image rotating switch 19 is operated to send a control signal from a CPU 55 to the motor 34 and the lens barrel 30 is consequently rotated. The consequent rotation of the image is continued until the image assumes the prescribed posture. Then, when the fine adjustment mode is selected by the selection key 51 and, at the same time, a desired one of the four arrow mark keys 50a to 50d in the aforementioned key 50 is selected as for the purpose of adjusting the position of the image projected on the screen 12, the angle of rotation of the prism 31 or the lens barrel 30 is computed by the CPU 55 based on the signal from the sensor unit 37 and the first linear pulse motor 23 for moving the carrier part 26 in the X-axis direction and the second linear pulse motor 25 for moving it in the Y-axis direction are controlled in accordance with the outcome of the computation.

FIG. 7 (a) to FIG. 7 (d) are diagrams each illustrating part of the microfiche F as positioned by the carrier part 26 so that the part of image frame indicated by the letter "A" assumes the position of a projected light path 56. When the microfiche F is loaded in any of the postures shown in the diagrams, the image frame is projected in its normal posture on the screen 12. This projection of the image frame in the normal posture is attained when the reader printer has one prism 31 and an odd number of mirrors disposed in the projected light path between the prism 31 and the screen 12. When the microfiche F which has the image frames thereof recorded as directed longitudinally, for example, as illustrated in FIG. 7 (a) is loaded in its normal posture in the carrier part 26 so that the upper part thereof falls on the recessed side of the carrier part 26, the angular position of the prism 31 such that the image is projected in the same direction as shown in FIG. 7(a) on the screen 12 is taken as the standard angle (0 degree or 180 degrees) of the prism 31. When the prism 31 has assumed the standard angle, the direction in which the film is moved agrees with the direction in which the image is moved on the screen 12.

FIG. 7 (b) represents the case in which the microfiche F having the image frames recorded as directed longitudinally is loaded in the state rotated by 90 degrees counterclockwise from its normal posture or the case in which the microfiche F having the image frames recorded laterally as rotated by 90 degrees counterclockwise is loaded in the normal posture. In this case, the image is made to be projected in a prescribed posture on the screen 12 by rotating the prism 31 by either 45 degrees or 225 degrees relative to the standard angle. Similarly, FIG. 7 (c) represents the case in which the microfiche F having the image frames recorded as directed longitudinally is loaded in the state rotated by 180 degrees relative to the normal posture, namely in the state reversed completely upside down. In this case, the image is made to be projected in a prescribed posture on the screen by rotating the prism 31 by 90 degrees or 270 degrees relative to the standard angle. Then, FIG. 7 (d) represents the case in which the microfiche F having the image frames recorded as directed longitudinally is loaded in the state rotated by 90 degrees clockwise from the normal posture. In this case, the image is made to be projected in a prescribed posture by rotating the prism 31 by 135 degrees or 315 degrees.

When the film F is loaded in a varying posture illustrated in FIG. 7 or when the film F having the image frames recorded in a varied direction is loaded, the image is made by the optical image rotating mechanism to be projected in the normal posture on the screen 12. When the projected image is required to be moved on the screen in any of the upper, lower, left, and right directions, the direction in which the film is moved may be varied by the angle of rotation of the prism 31.

Figure 8:
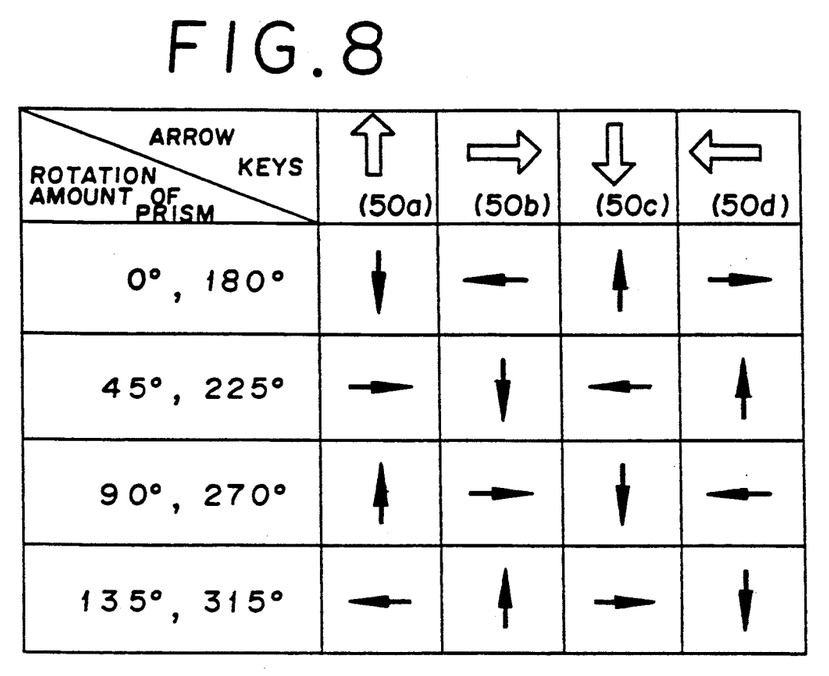
FIG. 8 is an explanatory diagram showing the relation between the arrow keys disposed on the control board and the directions of movement of the microfilm in consequence of the operation of the respective keys, with respect to a varying amount of rotation of the prism.

FIG. 8 is a table showing the relation between the directions indicated by the arrow marks on the arrow-mark keys 50a to 50d or the directions in which the image is desired to be observed on the screen (which directions are the opposites of the directions in which the projected image is moved on the screen 12) and the directions in which the carrier part 26 is moved, with respect to the angles of rotation of the prism 31 from the standard angle thereof.

To be specific, when the film F is loaded in the carrier part 26 in the state illustrated in FIG. 7 (a), the prism 31 forms an angle of rotation of either 0 degree or 180 degrees relative to the home position thereof. When the image frame above the image frame indicated by the letter "A" is desired to be observed on the screen in the existing state, the operator is called to manipulate the arrow-mark key 50a. The film F itself, therefore, is moved by the carrier part 26 in the direction of the operator. In other words, this movement occurs in the direction of Y1 shown in the diagram of FIG. 2. As a result, the image frame indicated by the letter "A" is moved downwardly on the screen 12.

When the upper part of the image frame indicated by the letter "A" is desired to be observed while the film F is loaded in the state illustrated in FIG. 7 (b), the operator is called to manipulate the arrow-mark key 50a in the same manner as described above. In this case, the carrier part 26 is moved rightwardly or in the direction of X1 shown in FIG. 2.

In FIG. 8, as respects the direction in which the carrier part 26 is actually moved, the downward arrow mark shown in the table represents the movement of the carrier 26 in the direction of Y1, the upward arrow mark in the direction of Y2, the rightward arrow mark in the direction of X1, and the leftward arrow mark in the direction of X2 respectively.

Figure 9:
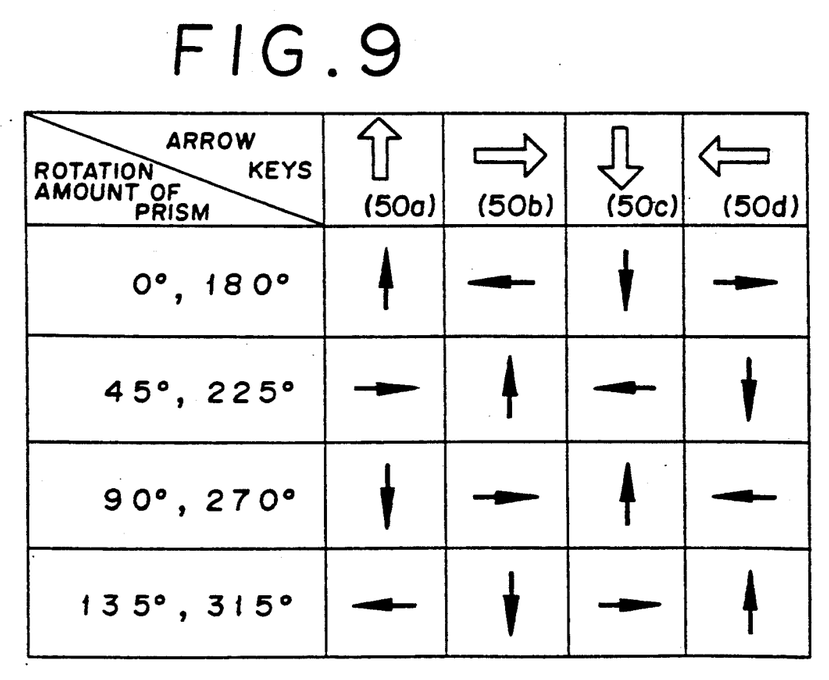
FIG. 9 is an explanatory diagram showing the relation between the arrow-marked keys disposed on the control board in an image projecting apparatus of another type and the directions of movement of the microfilm in consequence of the operation of the respective keys, with respect to a varying amount of rotation of the prism.

The description made thus far is based on the assumption that the reader printer has one prism and an odd number of mirrors disposed in the path of projected light. In the reader printer which has one prism and an even number of mirrors similarly incorporated therein, the microfiche F is set in the reversed posture on the carrier part 26. The relation between the directions indicated by the arrow marks on the arrow-mark keys 50a to 50d and the directions of movement of the carrier part 26 in the reader printer of this type, with respect to the angles of rotation of the prism 31 from the standard angle thereof, is shown in FIG. 9.

As described above, the operator is enabled to move the film in a proper direction and, as a result, to move the projected image easily in a desired direction on the screen by keeping an eye on the image projected on the screen 12 and selecting a proper one of the arrow-mark keys 50a to 50d which indicates the direction identical with the direction in which the image desired to be observed on the screen is located and manipulating the selected arrow-mark key, no matter how much the prism 31 as an optical image rotating mechanism has been rotated. Thus, the apparatus enjoys notably enhanced operational efficiency.

This operation of movement is performed equally efficiently in the fine adjustment effected by inching the image on the screen and the movement of the film in one frame at a stroke. Mainly, it is effective in the fine adjustment of the position of the image.

If an image recorded in the film F happens to be slightly tilted from the prescribed direction, the operator is allowed by the manipulation of the image rotating switch 19 to set this image in a desired posture and project the image now in a corrected posture on the screen. In this case, by having the amount of rotation of the prism 31 from the standard angular position thereof measured with an encoder and the outcome of this measurement committed to memory, the direction of movement of the carrier 26 is set similarly based on the operation of the fine adjustment/frame feeding key 50. In this case, the amount of movement of the carrier part 26 is controlled both in the X direction and the Y direction.

The embodiments described thus far have assumed that the direction of movement of the carrier part 26 is computed by the control circuit based on the outcome of detection of the angle of rotation of the prism 31. Alternatively, the direction of movement of the carrier part 26 may be determined by incorporating in the reader printer a rotary switch adapted to rotate synchronously with the rotation of the prism 31 and causing the arrow-mark keys 50a to 50d to select a proper one of contact pairs formed between a plurality of movable contacts placed on the rotary switch and stationary contacts severally adapted to touch the corresponding movable contacts.

FIG. 10 is a diagram illustrating a rotary switch 59 adapted as described above. This switch 59 is synchronized with the angle of rotation of the prism 31 and is rotated by an angle twice the angle of rotation of the prism 31 in the counterclockwise direction in the diagram. This switch 59 is provided with four movable contacts A to D circumferentially separated by angular intervals of 90 degrees around the center of rotation thereof. The contact A is electrically connected to the arrow-mark key 50a, the contact B to the arrow-mark key 50b, the contact C to the arrow-mark key 50c, and the contact D to the arrow-mark key 50d respectively. A stationary side member (not shown) disposed contiguously to the switch 59 is provided with stationary contacts 60a to 60d which are allowed to touch the contacts A to D indiscriminately. When a signal is transmitted through the movable contacts A to D to the stationary contacts 60a to 60d, the signal for moving the carrier part 26 to the direction indicated by the relevant arrow mark is forwarded to the control circuit.

Figure 10A:
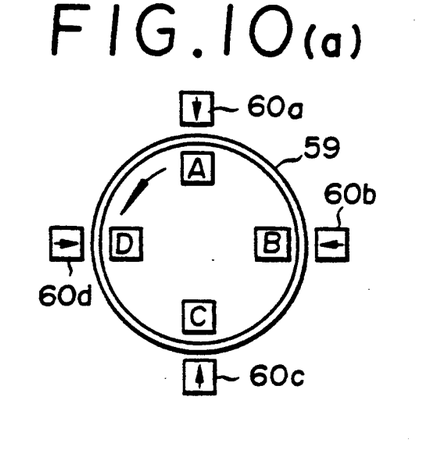
Figure 10B:
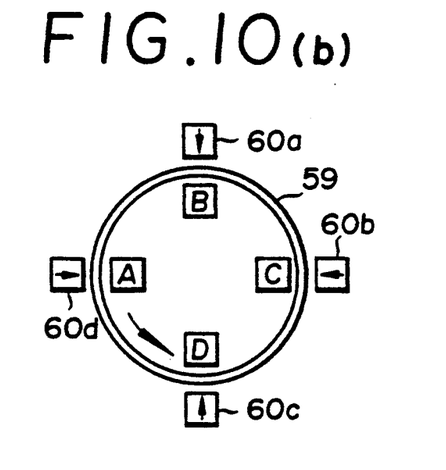
Figure 10C:
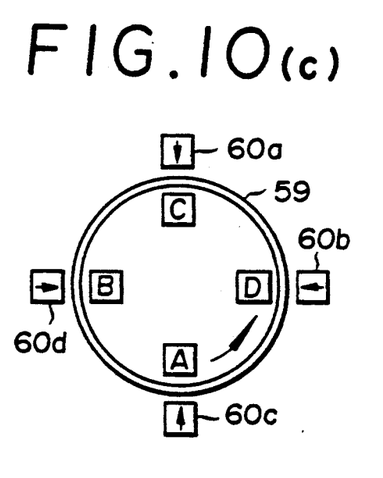
Figure 10D:
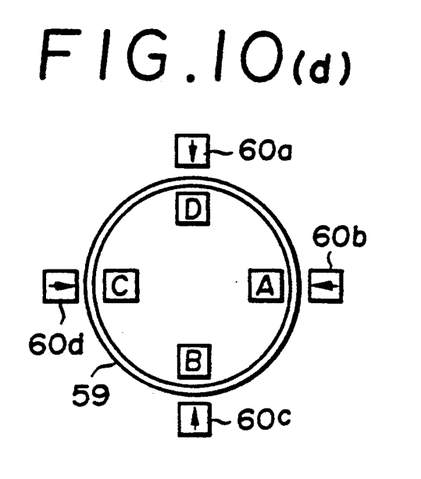
Figure 11:
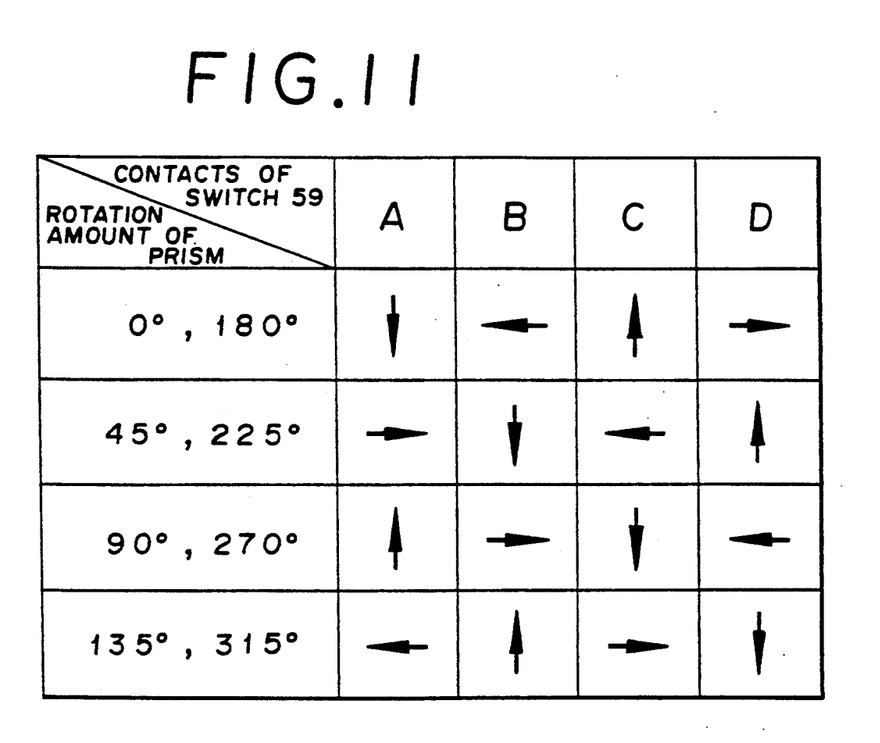
FIG. 11 is an explanatory diagram showing the relation between the contacts shown in FIG. 10 and the directions of movement of a film produced when a signal is forwarded through the contacts to the control part.

FIG. 11 is a diagram illustrating the directions in which the carrier 26 is moved when signals are transmitted to the movable contacts A to D shown in FIG. 10 by the operation of the arrow-mark keys 50a to 50d shown in FIG. 5, in relation to the amounts of rotation of the prism 31 and the movable contacts A to D. The illustrated relations are established similarly to those shown in FIG. 8 when the reader printer is provided with one prism 31 and an odd number of mirrors.

In FIG. 10 (a), the positions which the movable contacts A to D formed on the switch 59 assume when the angle of rotation of the prism 31 is at the standard angle (0 degree or 180 degrees) are shown. When the arrow-mark key 50a is depressed at this position of rotation, a signal for moving the carrier part 26 in the direction of the downward arrow mark is transmitted from the movable contact A via the stationary contact 60a to the control circuit. When the prism 31 is rotated by 45 degrees or 225 degrees from the state of the standard angle, the switch 59 is rotated counterclockwise by an angle twice the angle of rotation of the prism 31 as synchronized with the rotation of the prism 31, with the result that the movable contacts A to D will assume the positions shown in FIG. 10 (b). When the arrow-mark key 50a is depressed in this state of the apparatus, a signal for moving the carrier part 26 in the direction of the rightward arrow mark as illustrated in FIG. 11 is transmitted via the movable contact A and the stationary contact 60d to the control circuit. Similarly, when the prism 31 is rotated by 90 degrees or 270 degrees from the standard angle, the movable contacts A to D are moved to the positions shown in FIG. 10 (c). When this rotation is made by 135 degrees or 315 degrees, the movable contacts A to D are moved as shown in FIG. 10 (d).

Figures 12A, 12B, 12C, 12D:
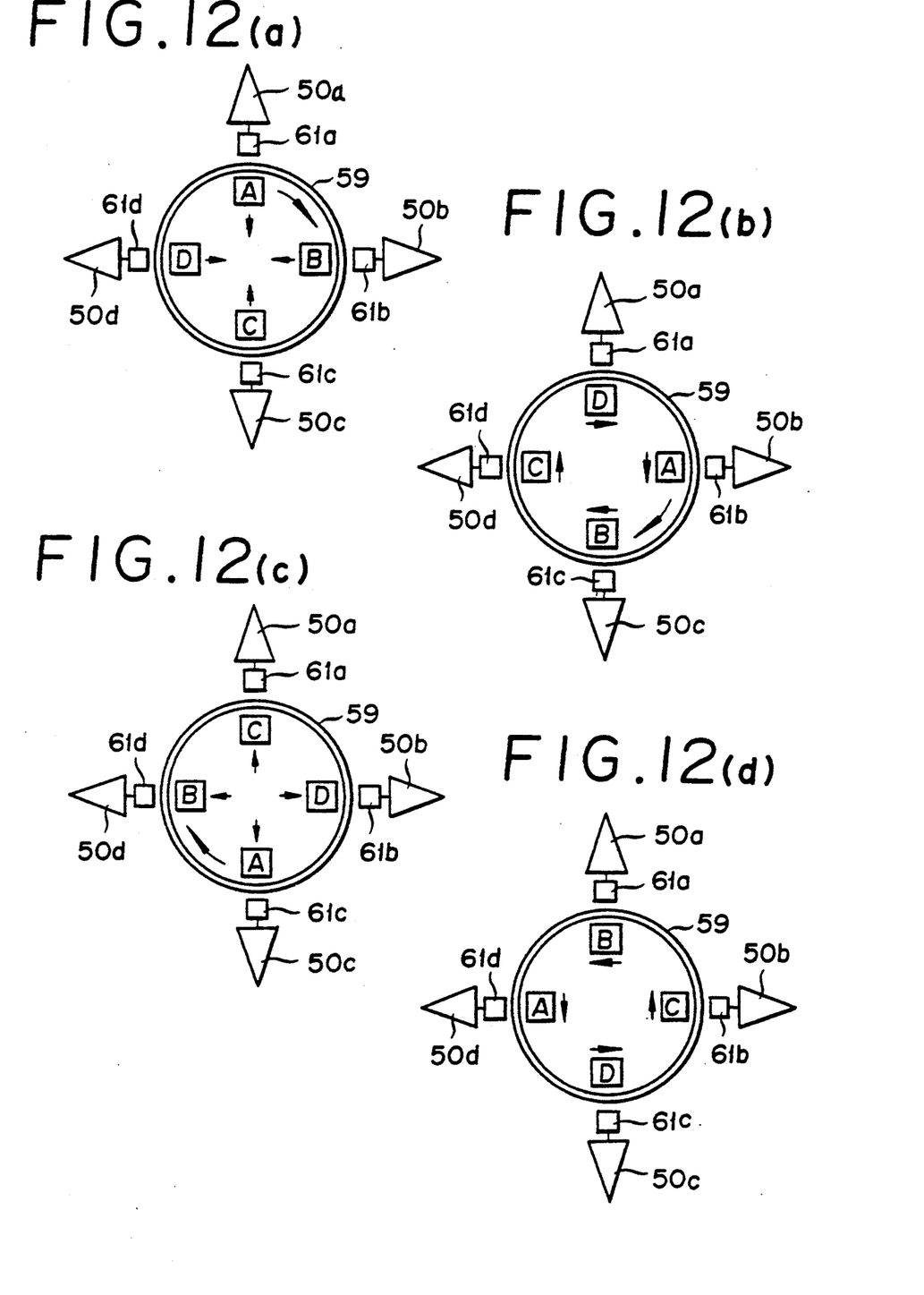

FIG. 12 is a diagram illustrating a rotary switch 59 of another type. Though this switch 59 is rotated by an angle twice the angle of rotation of the prism 31 like that shown in FIG. 10, it is rotated clockwise instead. In this case, the arrow-mark key 50a is electrically connected to the stationary contact 61a, the arrow-mark key 50b to the stationary contact 61b, the arrow-mark key 50c to the stationary contact 61c, and the arrow-mark key 50d to the stationary contact 61d respectively. The movable contacts A to D adapted to touch these stationary contacts indiscriminately are formed on the switch 59 and signals are transmitted from these movable contacts A to D to the control circuit. To the control circuit, the movable contact A transmits a signal for moving the carrier part 26 in the direction of the downward arrow mark, the movable contact B in the direction of the leftward arrow mark, the movable contact C in the direction of the upward arrow mark, and the movable contact D in the rightward arrow mark respectively.

In this case, the directions in which the carrier part 26 is moved when the arrow-mark keys 50a to 50d are operated after the prism has been rotated by prescribed angles are equal to those shown in FIG. 8. The apparatus in this case is provided with one prism 31 and an odd number of mirrors similarly to the apparatus shown in FIG. 8. When the arrow-mark key 50a is depressed while the prism 31 remains at the standard angle as illustrated in FIG. 12 (a), the stationary contact 61a transmits a signal to the movable contact A and the movable contact A transmits to the control part a signal for moving the carrier part 26 in the direction indicated by the downward arrow-mark. When the prism 31 is rotated by 45 degrees or 225 degrees from the standard angle, the switch 59 is rotated clockwise as synchronized with the rotation of the prism 31 and made to assume the state shown in FIG. 12 (b), with the result that the movable contacts A to D formed on the switch 59 will touch the corresponding stationary contacts. When the arrow-mark key 50a is depressed in this state, a signal is transmitted via the movable contact D to the control part and the carrier part 26 is moved in the direction indicated by the rightward arrow mark. Similarly, the switch 59 assumes the state shown in FIG. 12(c) when the prism 31 is rotated by 90 degrees or 270 degrees and it assumes the state shown in FIG. 12 (d) when the prism 31 is rotated by 135 degrees or 315 degrees.

When a multiplicity of movable contacts are formed in addition to the four movable contacts A to D mentioned above on the switch 59 of the type illustrated in FIG. 12, the direction of movement of the carrier part 26 can be readily determined no matter how much the switch 59 synchronized with the rotation of the prism 31 is rotated. Similarly, when a multiplicity of stationary contacts are formed in addition to the illustrated stationary contacts 60a to 60d on a switch 59 of the type illustrated in FIG. 10, the direction of movement of the carrier part 26 can be readily determined no matter how much the switch 59 synchronized with the rotation of the prism 31 is rotated. In these cases, even when the film is loaded in a slightly tilted state in the carrier part 26 and the prism 31 is finely adjusted to rotate the image by a small angle for the purpose of enabling the image to be projected in its proper posture on the screen 12, the work of giving fine adjustment to the position of the film or moving the film in one frame at a stroke is facilitated. The addition of such movable contacts or stationary contacts is effective particularly in the movement of the image by fine adjustment to the prescribed position on the screen 12.

The embodiments described above are based on the assumption that the directions of the arrow marks inscribed on the arrow-mark keys 50a to 50d indicate the directions in which the image projected on the screen 12 is desired to be observed. Alternatively, the arrow marks may be inscribed in the respective keys so as to indicate the directions in which the image is desired to be moved.

Figure 14:
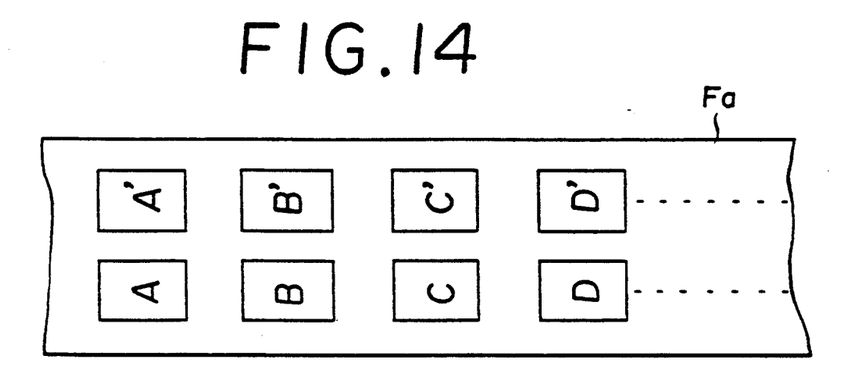
FIG. 14 is a front view illustrating part of a roll film of the duplex type.

The illustrated image projecting apparatus has been described as using a microfiche F as a microfilm. This invention can be similarly embodied in an image projecting apparatus using a roll film. When images recorded on a roll film Fa of the duplex type as illustrated in FIG. 14 are to be projected on the screen 12, for example, these images are made to be projected as rotated by 90 degrees by rotating the prism 31 by 45 degrees. When the film Fa is moved in the longitudinal direction, therefore, the image on the screen 12 moves in the vertical direction. The switch between the first and second strips of the film is accomplished by the manipulation of the arrow-mark keys 50a and 50c.

Figure 15:
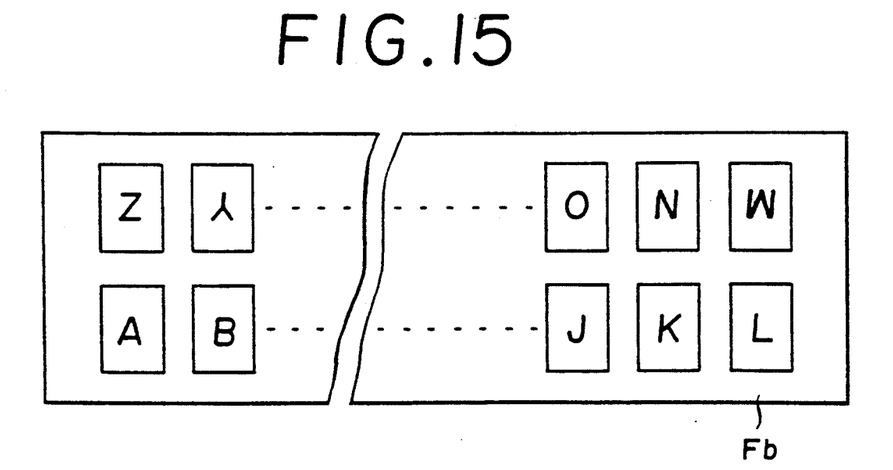
FIG. 15 is a front view illustrating part of a roll film of the duo type.

In an image projecting apparatus using a roll film Fb of the duo type as illustrated in FIG. 15, when one channel of the roll film Fb is passed through the path of projected light and the trailing end of the roll film Fb is brought to the position of the projected light path by continuous depression of the arrow-mark key 50b, the switch of the first channel to the second channel is effected by automatically rotating the prism 31 by 90 degrees. After the film Fb has been moved to the last image frame "L" in the first channel, the direction of movement of the film is reversed and then the image frames "M," "N," "O," . . . are sequentially projected on the screen.

While this invention has been illustrated and described in accordance with a preferred embodiment, it is recognized that variations and changes may be made and equivalents employed herein without departing from the invention as set forth in the claims.

I claim:

1. An image projecting apparatus for causing an image recorded on a microfilm to be magnified with a lens and projected on a screen, comprising:
    film retaining means for retaining said microfilm;
    image rotating means for rotating a projected image;
    detecting means for detecting the amount of rotation of said image rotating means;
    indicating means for indicating the direction of movement of said image projected on said screen;
    driving means for moving said retaining means in a plane parallel to the surface of the microfilm; and
    control means for controlling said driving means so as to move said retaining means in a direction determined in accordance with the amount of rotation detected by said detecting means and the direction indicated by said indicating means.

2. The image projecting apparatus according to claim 1, wherein said image rotating means incorporates therein a rotatably attached prism.

3. The image projecting apparatus according to claim 1, wherein said microfilm is a microfiche.

4. The image projecting apparatus according to claim 1, wherein said microfilm is a roll film.

5. The image projecting apparatus according to claim 1, wherein said film retaining means is rendered movable in a horizontal plane.

6. An image projecting apparatus for causing an image recorded on a microfilm to be magnified with a lens and, projected on a screen, comprising:
    film retaining means for retaining said microfilm;
    image rotating means for rotating a projected image;
    first indicating means operated manually for indicating the direction of movement of said image projected on said screen;
    second indicating means for indicating the direction of movement of said film retaining means corresponding to the direction indicated by said first indicating means, wherein the correspondence of the direction indicated by said first indicating means to that indicated by said second indicating means is changed in accordance with the amount of rotation of said image rotating means, and
    driving means for driving said retaining means in the direction indicated by said second indicating means.

7. The image projecting apparatus according to claim 6, wherein said image rotating means incorporates therein a movably attached prism.

8. The image projecting apparatus according to claim 6, wherein said microfilm is a microfiche.

9. The image projecting apparatus according to claim 6, wherein said microfilm is a roll film.

10. The image projecting apparatus according to claim 6, wherein said film retaining means is rendered movable in a horizontal plane.

11. An image projecting apparatus for causing an image recorded on a microfilm to be magnified with a lens and, projected on a screen, comprising:
    film retaining means for retaining said microfilm;
    image rotating means for rotating the projected image;
    inputting means for introducing as an input the direction of movement of said image projected on the screen;
    direction determining means for determining the direction of movement of said film retaining means corresponding to the direction input by said input means in accordance with the amount of the rotation of said image rotated by said image rotating means, and
    driving means for driving said retaining means in the direction determined by said direction determining means.

12. The image projecting apparatus according to claim 11, wherein said inputting means is provided with four keys corresponding to the upper, lower, left, and right directions of the screen and said direction determining means is provided with a rotary switch adapted to be rotated as synchronized with said image rotating means and having formed thereon four movable contacts electrically connected severally to said four keys and a plurality of stationary contacts adapted to touch said movable contacts indiscriminately and consequently set the direction of movement of said film retaining means.

13. The image projecting apparatus according to claim 11, wherein said inputting means is provided with four keys corresponding to the upper, lower, left, and right directions of the screen and said direction determining means is provided with a rotary switch adapted to be rotated as synchronized with said image rotating means and having formed thereon a plurality of movable contacts for setting the direction of movement of said film retaining means, and stationary contacts connected severally to said four keys and adapted to touch said movable contacts indiscriminately.

14. The image projecting apparatus according to claim 11, wherein said image rotating means incorporates therein a rotatably attached prism.

15. The image projecting apparatus according to claim 11, wherein said microfilm is a microfiche.

16. The image projecting apparatus according to claim 11, wherein said microfilm is a roll film.

17. The image projecting apparatus according to claim 11, wherein said film retaining means is rendered movable in a horizontal plane.

* * * * *